Patented Mar. 16, 1937

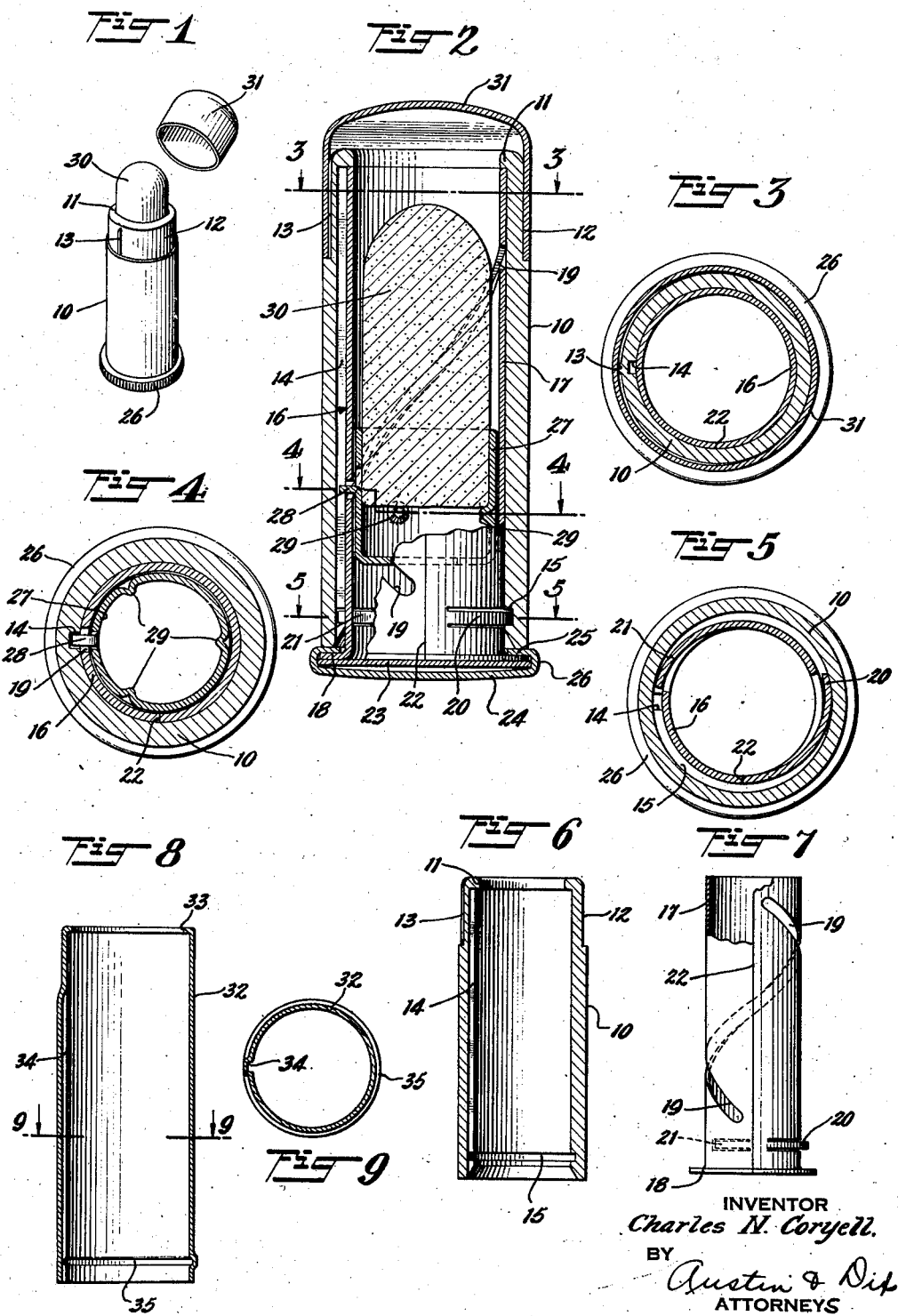

2,074,016

UNITED STATES PATENT OFFICE 2,074,016

HOLDER FOR STICK MATERIAL

Charles N. Coryell, Mamaroneck, N. Y.

Application June 23, 1932, Serial No. 618,885
Renewed October 31, 1934

3 Claims. (Cl. 206—56)

The invention relates to containers, and more particularly to holders for dispensing stick material.

According to one form which the invention may assume, the holder may comprise a cylindrical casing having a straight axial groove. Disposed within the casing may be an operating member of tubular form having a helical slot. Disposed within the last mentioned member may be a carrier member carrying the stick material which may be a lipstick. A suitable projection may be provided on the carrier member fitting into the helical slot and into the axial slot whereby relative rotation of the casing and the operating member feeds the lipstick in and out.

It is preferable to make the casing of molded material, such as bakelite, although this member may also be made of metal. If desired, the upper end of the casing may be reduced to accommodate a cover fitting flush with the outside of the casing.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawing forming a part thereof, in which Fig. 1 is a perspective of the holder for stick material according to the invention;

Fig. 2 is a longitudinal section thereof;

Figs. 3, 4, and 5 are transverse sections taken on the lines 3—3, 4—4, and 5—5 respectively of Fig. 2;

Fig. 6 illustrates the outer casing of molded material;

Fig. 7 illustrates a part of the operating member;

Fig. 8 illustrates an outer casing of metal; and

Fig. 9 is a section on the line 9—9 of Fig. 8.

In the following description and in the claims, various details will be identified by specific names for convenience, but they are intended to be as generic in their application as the art will permit.

Like reference characters denote like parts in the several figures of the drawing.

In the drawing accompanying and forming part of this specification, certain specific disclosure of the invention is made for purposes of explanation, but it will be understood that the details may be modified in various respects without departure from the broad aspect of the invention.

Referring now to the drawing, the casing 10 (Fig. 6) may be made of suitable molded material, such as bakelite, and is provided with an upper inwardly extending flange 11 and a reduced portion 12 having a longitudinal rib or protuberance 13. The casing 10 is also provided with a straight axial inner groove 14 extending clear to the bottom of the casing and a circular groove 15 intersecting the groove 14. The lower part of the inner surface of the casing flares outwardly to facilitate assembly, as hereinafter described more in detail.

The operating member 16 is made up of a cylindrical tube 17 (Fig. 7) having a helical slot 19, an annular flange 18 and struck out circular tongues 20 (Fig. 5). This member is preferably made from flat stock in which the slot 19 is cut diagonally on a straight line so that when the stock is rolled into the cylindrical form shown in Fig. 7, the slot takes the helical form. The annular flange 18 may be placed on the tube either before or after rolling into cylindrical form. The abutting edges of the cylinder are denoted by 22, these edges being held in position by the cap or plate secured to the flange 18 as will be hereinafter described more in detail.

Disposed at the bottom of the cylindrical tube 17 is a plate 23 under which is disposed a plate 24 having its edge turned in and down upon the flange 18, by a process well known in the art, in such manner as to securely clamp the tubular member 17 in its tubular form and to also clamp the plates 23 and 24 thereto. If desired, the outer edge of the plate 24 may be knurled, as indicated by 26 (Fig. 1).

Disposed within the operating member 16 is a carrier member 27 of tubular form having a struck out projection 28 passing through the helical slot 19 into the straight groove 14 (Fig. 4). The carrier member 27 may also have a plurality of struck in projections 29 to fix the position of the stick material 30.

The protuberance or rib 13 is of relatively small dimension, as shown, and is for the purpose of insuring a tight fit between the cap 31 and the casing 10. This takes care of any slight difference in dimensions caused in the manufacture of these parts. The cap 31 may be made of metal and in one form illustrated is flush with the outside of the casing.

To assemble the parts, the carrier member 27 is placed within the operating tube 16 with the projection 28 within helical groove 19. The operating tube 16 is then inserted into the bottom of the casing tube 10 with projection 28 sliding in groove 14. The tapered lower end of the inside surface of casing tube 10 assists compressing the spring tongues 20, facilitating assembly, the tongues 20 then expanding into the groove 15.

In order to use the holder, the cap 31 is first removed and the stick material fed outwardly by turning the knurled portion 26 with respect to the casing 10. The relative movement of the helical slot 19 and straight groove 14 feeds the carrier member 27 upwardly. The stick material is retracted by rotation of the parts in the opposite direction. The operating member 16 and casing 10 are held in assembled position by the disposition of the tongues 20 in the groove 15.

Referring now to Figs. 8 and 9, in this form the casing 32 is made of metal, and is provided with an inturned flange 33, circular groove 35 and a straight axial groove 34. It will be noted that due to the type of material, the formation of these grooves causes corresponding beads to be formed on the outer surface of the casing. If desired, a carrier member and operating member, similar to that described above, may be used with this casing. A suitable cap (not shown) may also be provided, with this form fitting over the outside of the casing 32. In the form shown no provision is made for seating the cap flush with the outer surface of the casing, but, if desired, this feature may be incorporated.

The above construction has the advantage of being inexpensive to produce and comprises a minimum number of parts. The holder is especially attractive when the casing is made of colored molded material which contrasts agreeably with the brightness of the metal operating member and cap. In this construction it is quite simple to place a straight axial groove in the inner wall of the casing and a helical slot in the operating member. The above construction also insures ease and smoothness of operation and the rib on the casing also insures the proper fit between cover and casing.

While certain novel features of the invention have been disclosed and are pointed out in the annexed claims, it will be understood that various omissions, substitutions and changes may be made by those skilled in the art without departing from the spirit of the invention.

What is claimed is:

1. A holder for stick material and the like comprising an outer cylindrical casing tube having thick walls, said tube having an upper, inwardly extending flange and having a lower circular end groove in its inner wall, said tube also having a straight longitudinal groove extending from said end flange to the lower end of said tube, the depth of said grooves being less than the thickness of the wall of said casing tube, said casing tube having a lower flaring mouth between said circular groove and the lower end of the tube, an inner operating tube disposed within said casing tube against said end flange, said inner tube having a helical slot and a lower cap member disposed against the lower edge of said casing tube, a carrier member within said inner tube and having a part fitting in said helical and longitudinal slots, said inner tube having spring members riding in said circular groove.

2. A holder for stick material and the like comprising an outer cylindrical casing tube having thick walls and having a substantially smooth exterior surface throughout the exposed part of the casing tube, said tube having an upper, inwardly extending end flange and having a lower circular end groove in its inner wall, said tube also having a straight longitudinal groove extending from said end flange to the lower end of said tube, the depth of said grooves being less than the thickness of the wall of said casing tube, said casing tube having a lower flaring mouth between said circular groove and the lower end of the tube, an inner operating tube disposed within said casing tube against said end flange, said inner tube having a helical slot and a lower cap member disposed against the lower edge of said casing tube, a carrier member within said inner tube and having a part fitting in said helical and longitudinal slots, said inner tube having circular cantilever spring tongues riding in said circular groove, said casing tube having a reduced upper end forming a small shoulder on its exterior surface, and a thin walled cover on said reduced upper end disposed against said shoulder.

3. A holder for stick material and the like comprising an outer cylindrical casing tube having comparatively thick walls, said tube having an upper inwardly extending flange and having a lower circular end groove in its inner wall near the bottom thereof, said tube also having a straight longitudinal groove extending from substantially said end flange to the lower end of said tube, the depth of said grooves being less than the thickness of the wall of said casing tube, an inner operating element comprising an inner tube and a lower cap member, said inner tube disposed within said casing tube with its upper end adjacent said end flange, said inner tube having a helical slot, said cap member being disposed adjacent the lower edge of said casing tube, a carrier member within said inner tube and having a part fitting in said helical slot and longitudinal groove, said operating member having spaced projections riding in said circular groove to hold said casing tube and operating member assembled.

CHARLES N. CORYELL.